C. P. STANFORD.
Ore-Feeder.

No. 167,625. Patented Sept. 14, 1875.

Witnesses
Edward E. Osborn
Wm. D. English

Inventor:
Charles P. Stanford
By C.W.M. Smith
Attorney

UNITED STATES PATENT OFFICE.

CHARLES P. STANFORD, OF SAN FRANCISCO, CALIFORNIA.

IMPROVEMENT IN ORE-FEEDERS.

Specification forming part of Letters Patent No. 167,625, dated September 14, 1875; application filed May 1, 1875.

*To all whom it may concern:*

Be it known that I, CHARLES P. STANFORD, of San Francisco, State of California, have invented a new and useful Improvement in Ore-Feeders for Stamp-Mills, of which the following is a specification:

My invention relates to automatic ore-feeders for stamp-mills that are actuated by the movements of the stamp-stem, and caused to feed a certain quantity of ore from a hopper to the stamps at proper intervals. It consists of an oscillating feeder, having a bottom of curved form, supported by bearings in a suitable frame-work in front of the hopper, and caused to vibrate in the arc of a circle toward and away from the stamp, the vibratory movement being produced by the fall of the stamp-stem, and made to deliver a certain quantity of ore at each movement backward from the stamps.

The object of my invention is to produce an automatic feeder that shall operate to feed ore to the stamps in a better manner than has been done heretofore, and to make a stronger and more substantial apparatus with a small amount of material, and without any complicated mechanism to produce the required vibrations, as will be fully described hereafter.

Figure 1:
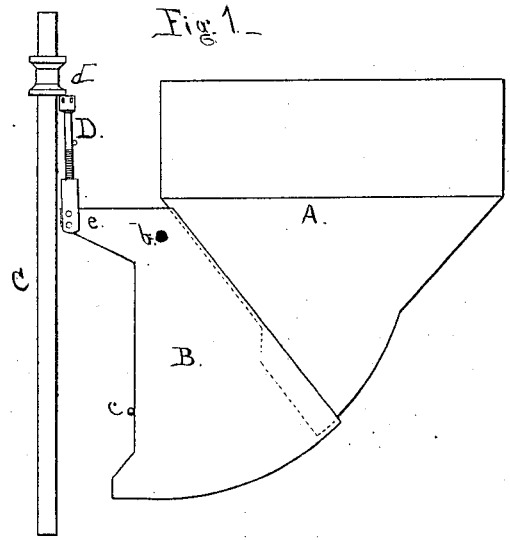

The accompanying drawing shows, in Figure 1, a side elevation of an ore-hopper with my oscillating feeder in front of it, in position to deliver the ore to the stamps when it is vibrated or thrown back by the movement of the stem.

The hopper A has its mouth contracted where it enters between the sides of the feeder B, and its rear side at this part has a curved form corresponding to the curve of the feeder bottom. Thus a continuous curved surface is produced from the inclined side of the hopper to the front of the feeder, which facilitates the descent of the ore, and prevents any choking in the mouth of the hopper. This curve of the feeder bottom is formed on an arc of a circle, the center of which is at or near the pivots or bearings $b$ that support the feeder, and the front end of the feeder projects beyond the line of the bearings and toward the stamp-stem sufficiently to keep upon the feeder the ore that is falling from the hopper, and to prevent any of it dropping off the end of the feeder while it occupies its forward position, as shown in Fig. 1. This front end is made straight, as shown, the better to deliver the ore, or allow it to drop from it into the pan beneath the stamp when the feeder is actuated by the stamp-stem. This form of the feeder and the manner of hanging it tends to throw the front end toward the stamp-stem, as the weight of the ore upon it increases, the force of gravity causing the feeder to take the position that will bring the greatest part of its contents beneath the line of the bearings $b$, and its position forward toward the stamp is regulated by the stop $c$, which prevents any motion of the feeder beyond a certain point. Its vibration, or motion backward from this position, is produced by the action of the collar $d$ of the stamp-stem in striking upon the top of the tappet-rod D, that projects from the side of the feeder, the part of the feeder to which this rod is secured being extended out from the feeder nearly in a horizontal plane with the bearings or pivots $b$, and at right angles to the vertical face or front of the feeder. Thus a sufficient leverage is obtained to cause the feeder to be thrown backward as the stamp-stem falls and strikes the rod D, and to move it beneath the body of ore lying on the curved bottom. Thus the feeder is moved in one direction by the action of the stamp-stem, but returns to its normal position after each movement, by virtue of its own weight, without the use of springs; and it also works without raising or lifting any weight of the ore upon it. This movement of the feeder has the effect of causing a certain quantity of ore to drop from the front end of the feeder at each backward movement by causing the ore upon the curved bottom to gravitate forward as the feeder is thrown backward beneath it. Thus the action of the collar and the tappet-rod is to throw the feeder backward, and from under the ore, which, by virtue of the inclined surface and of its weight, moves forward as the feeder bottom is moved backward beneath it, and causes a quantity of ore to drop off the end of the feeder. The curved bottom of the feeder facilitates this action, and causes the ore to feed itself down from the hopper in a regular manner to supply the place of that thrown off to the stamps.

Figure 2:
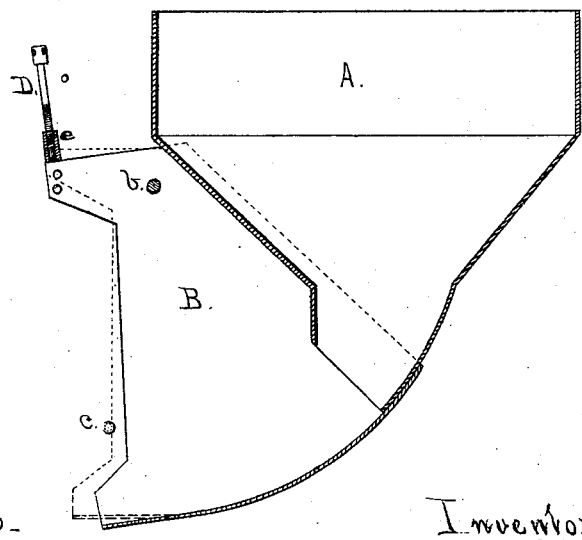

The extent of motion of the oscillating feeder is regulated by the length of the tapped rod D, and also by the extent of the rise and fall of the stamp-stem, and, consequently when the stamp has a sufficient quantity of ore beneath it, the stem will not fall far enough to actuate the tappet-rod and feed the ore from the hopper, and no vibration of the feeder will take place until the stamp-stem drops low enough to permit the collar *d* to strike the tappet-rod D. But the distance between the collar *d* and the end of the tappet-rod can be regulated by changing the length of the rod, which is furnished with a screw-thread upon the lower end that works in a socket, *e*, as shown in Fig. 2 of the drawing. Thus the feed may be caused to operate sooner or later during the fall of the stamp-stem, by making the tappet-rod longer or shorter, and the quantity or the frequency of the feeding-motion of the feeder is thus regulated.

Fig. 2 of the drawing shows a vertical section of the hopper and oscillating feeder, and also represents, in the full and dotted lines, the two positions of the feeder, both forward and backward.

In this form of feeder the weight of the ore is supported directly upon the pivots *b*, and these may be formed of a continuous rod extending across the feeder and projecting on each side far enough to allow the ends to work in proper bearings, and thus the ore is held and thrown to and beneath the stamps, without any strain or weight being put upon the vibrating mechanism, and the feeder returns to its place again after each movement backward, by virtue of its weight.

In these respects my invention is an improvement over feeders operated by means of a tappet rod or bar, connected at one end to the feeding-trough, which, while it agitates the feed-trough by being raised or struck by the stamp-stem, also serves to support or hold up the end of the feed-trough; and also, over those feeders that depend upon the aid of a spring to return them to the position from which they are moved by the action of the stamp-stem.

The action of my feeder is more delicate, also, than those feeding the ore by a jarring or shaking motion, and, therefore, it can be better adjusted to feed the ore in more definite and regular quantities, as the motion of the feeder is a sliding one beneath and from under the ore, causing a quantity to drop from the end of the feeder proportionate to the extent of motion of the feeder, and also causing the body of ore upon it to move forward over the curved bottom toward the front of the feeder without any raising or lifting movement on the part of the feeder.

Having thus fully described my invention and its mode of operation, what I claim therein as new, and desire, to secure by Letters Patent, is—

1. The combination, with an oscillating ore-stamp feeder, having its bottom formed on the arc of a circle, of an ore-hopper, having the back of its discharging-mouth curved to coincide with the curve of the feeder-bottom, for the purpose set forth.

2. The oscillating ore-stamp feeder described, having its pivot placed to the front side of the center of gravity, in combination with the stamp-stem, so that when its forward end is depressed by said stamp-stem it will return to its normal position by its own gravity, as and for the purpose set forth.

3. The oscillating ore-stamp feeder described, having its bottom formed on the arc of a circle, and having its pivot placed to the front side of the center of gravity, in combination with the stamp-stem, constructed and arranged, substantially as described and shown.

4. The combination, with an oscillating ore-stamp-feeder with its bottom formed on the arc of a circle and having its pivots placed to the front side of the center of gravity, of a stop for governing the extent of the forward motion of the feeder, substantially as described and shown.

In witness whereof I have hereunto set my hand this 13th day of April, 1875.

CHARLES P. STANFORD.

In presence of—
D. K. SWIM,
EDWARD E. OSBORN.